(12) United States Patent
Osaka et al.

(10) Patent No.: US 6,190,057 B1
(45) Date of Patent: Feb. 20, 2001

(54) OPTICAL FIBER RIBBON FUSION SPLICING APPARATUS

(75) Inventors: Keiji Osaka; Hidetoshi Hongu, both of Yokohama (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/139,668

(22) Filed: Aug. 25, 1998

(30) Foreign Application Priority Data

Aug. 25, 1997 (JP) .................................................. 9-228228

(51) Int. Cl.⁷ .................................................. G02B 6/255
(52) U.S. Cl. .................. 385/96; 385/95; 385/134
(58) Field of Search ................ 385/96, 97, 98, 385/99, 95, 134

(56) References Cited

U.S. PATENT DOCUMENTS 5,533,160  7/1996  Watanabe et al. .

FOREIGN PATENT DOCUMENTS

| 42 03 995 | 8/1993 | (DE) . |
| 0 710 858 | 5/1996 | (EP) . |
| 09113733 | * 5/1997 | (JP) . |

OTHER PUBLICATIONS

Patent Abstracts of Japan vol. 013, No. 406 (P–930), Sep. 8, 1989 & JP 01 147503 A (Sumitomo Electric Ind LTD; Others: 01), (Jun. 9, 1989).

Patent Abstracts of Japan vol. 097, No. 009, Sep. 30, 1997 & JP 09 113733 A (Fujikura LTD) May 2, 1997.

Patent Abstracts of Japan vol. 097, No. 011, Nov. 28, 1997 & JP 09 197156 A (Sumitomo Electric Ind LTD), Jul. 31, 1997.

Joly B: "Optical Interfaces in Cable Networks" Electrical Communication, Jan. 1, 1994 pp. 52–59, XP000445986 ISSN: 0013–4252.

* cited by examiner

*Primary Examiner*—Cassandra Spyrou
*Assistant Examiner*—Leo Boutsikaris
(74) *Attorney, Agent, or Firm*—Pillsbury Madison & Sutro LLP (57) ABSTRACT

An optical fiber ribbon Fusion-splicing apparatus for fusion-splicing end faces of optical fibers to each other includes an optical fiber jacket stripper including a portable main body, a power supply input terminal exposed/formed on one surface of the main body, a clamping and heating element for clamping a distal end portion of a coating of an optical fiber and heating/softening the distal end portion by using a heat accumulator which is electrically heated and has a large heat capacity, a pair of cutting blades for cutting a fiber jacket closer to a proximal end portion side of the optical fiber than the distal end portion, and a jacket stripping mechanism which is placed to oppose the clamping and heating element through the cutting blades and slides in a longitudinal direction of the optical fiber with respect to the clamping and heating element while holding the proximal end portion of the optical fiber, thereby stripping off the fiber jacket of the distal end portion, and a power supply terminal electrically connected to the power supply input terminal.

8 Claims, 9 Drawing Sheets

OPTICAL FIBER RIBBON FUSION SPLICING APPARATUS

BACKGROUND OF THE INVENTION

1. Field of the Invention

The present invention relates to an optical fiber ribbon fusion splicing apparatus that is used to strip off the jacket of optical fibers at end portion and splice the fiber end to each other, and more specially relates to an optical fiber ribbon Fusion splicing apparatus having an optical fiber jacket stripper.

2. Related Background Art

An optical fiber jacket stripper, for example, disclosed in Japanese Patent Laid-Open No. 1-147503 is known. This stripper is used to heat and soften the synthetic resin jackets of the distal ends of optical fibers and then strip them off when the optical fibers are to be spliced to each other. Since the jackets are removed after they are heated and softened, the jackets can be cleanly removed without any damage to the bare optical fibers inside the jackets.

SUMMARY OF THE INVENTION

The above jacket stripper is connected to an external power supply through a connection cord to be used. When an operator performs jacket removing operation while holding this jacket stripper with his/her hand, the connection cord may interfere with the operation. Therefore it is desired to improve such a jacket stripper to achieve further workability in a fusion-splicing process including jacket removal.

The present invention has been made to solve this problem, and provides a fusion-splicing apparatus which can strip off the optical fiber jackets and splice the optical fiber ends to each other with high workability.

An optical fiber ribbon Fusion splicing apparatus according to the present invention comprises an optical fiber jacket stripper and a fusion splicer. The jacket stripper includes a hand-held main body, a power supply input terminal formed on one surface of the main body, a clamping and heating element for clamping a distal end portion of an optical fiber jacket and softening the distal end portion by heating with a heat accumulator which is electrically heated and has a large heat capacity, a pair of cutting blades for cutting a fiber jacket, and a jacket stripping mechanism which is placed to oppose the clamping and heating element through the cutting blades and which slides in a longitudinal direction of the optical fibers with respect to the clamping and heating element while clamping the proximal end portion of the optical fiber, thereby stripping off the fiber jacket from the distal end portion. And the fusion splicer includes a fusion splicing portion for fusion-splicing the opposing end faces of optical fibers whose jackets are stripped off by the jacket stripper, a power supply unit connected to an external power supply or an internal power supply which is a built-in electric power generating unit or a rechargeable battery, a mount portion formed on upper surface of the optical fusion splicer for mounting the jacket stripper, and a contact terminal disposed at the mount portion and electrically connected to the power supply input terminal when the jacket stripper is mounted on the mount portion.

According to the present invention when the jacket stripper is mounted on the mount portion of the fusion splicer while the jacket stripper is not used, power can be easily supplied to the jacket stripper. The jacket stripper attached to the fusion splicing apparatus of the present invention can be disconnected from the power supply when the remover is to be used. In jacket removing operation, therefore, the connection cord that may interfere with the operation need not be used. This facilitates the operation. Even when the power supply to the clamping and heating element is disconnected in this operation, the heat accumulator with the large heat capacity can substantially prevent a drop in the temperature of the clamping and heating element during the time required to soften the fiber jacket. Consequently, the fiber jacket can be reliably and easily removed without any damage to the bare optical fiber inside the fiber jacket.

Preferably, the heat accumulator can keep a temperature of the clamping and heating element at 60° C. and above for 30 seconds after the power supply to the clamping and heating element is stopped when the temperature of the clamping and heating element rises over 70° C.

With this arrangement, adequate temperature can be kept for a sufficiently long period of time to soften the fiber jacket.

Preferably, the jacket stripper has a rechargeable battery in the main body, the rechargeable battery being capable of supply power to the clamping and heating element. In this case, even if the power from the fusion-splicing apparatus is interrupted, power can be supplied from the rechargeable battery to the clamping and heating element to allow the jacket stripper to operate for a long period of time.

The jacket stripper may further comprise a switch for switching such that a current from the power supply terminal is supplied to either the rechargeable battery and the clamping and heating element. With this switch, priority can be given to either temperature raising operation for the heat accumulator or charging operation.

The jacket stripper may further comprise a temperature sensor for detecting a temperature of the heat accumulator, and a temperature controlling circuit for performing switching control on the switch on the basis of a temperature detected by the temperature sensor. In this case, the temperature of the heat accumulator can be stably controlled.

This apparatus may further comprise an adapter for electrically connecting the power supply input terminal to the contact terminal. This adapter may be capable of being connected to an external power supply as well as the contact terminal.

With this arrangement, various power supplies can be used, and a further improvement in workability can be attained.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 7A and 7B are sectional views showing a switching portion in FIG. 6, in which

DESCRIPTION OF THE PREFERRED EMBODIMENTS

Optical fiber ribbon Fusion splicing apparatuses according to embodiments of the present invention will be described with reference to the accompanying drawings.

Figure 1A:
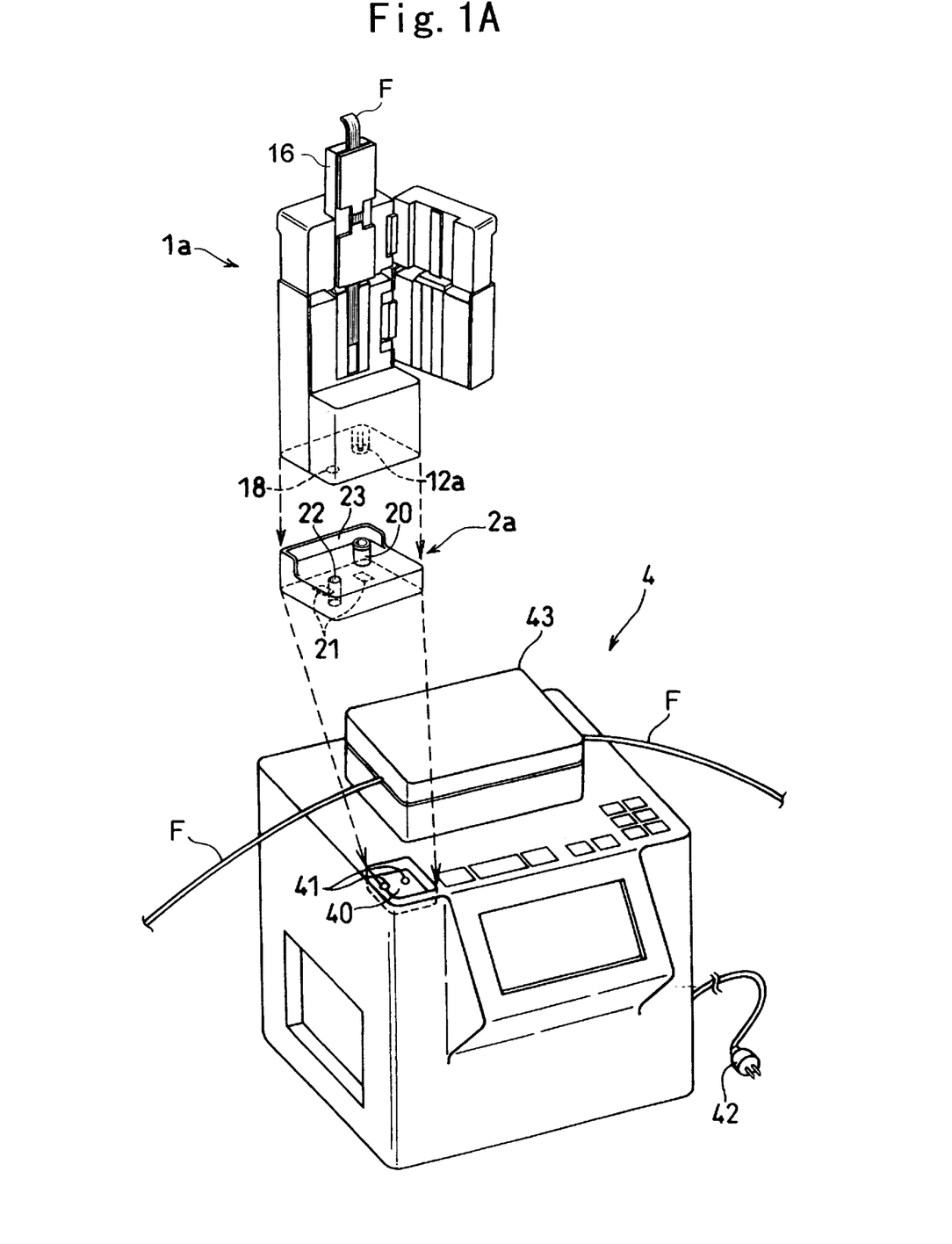
FIG. 1A is a perspective view showing an optical fiber ribbon Fusion splicing apparatus according to an embodiment of the present invention.
Figure 1B:
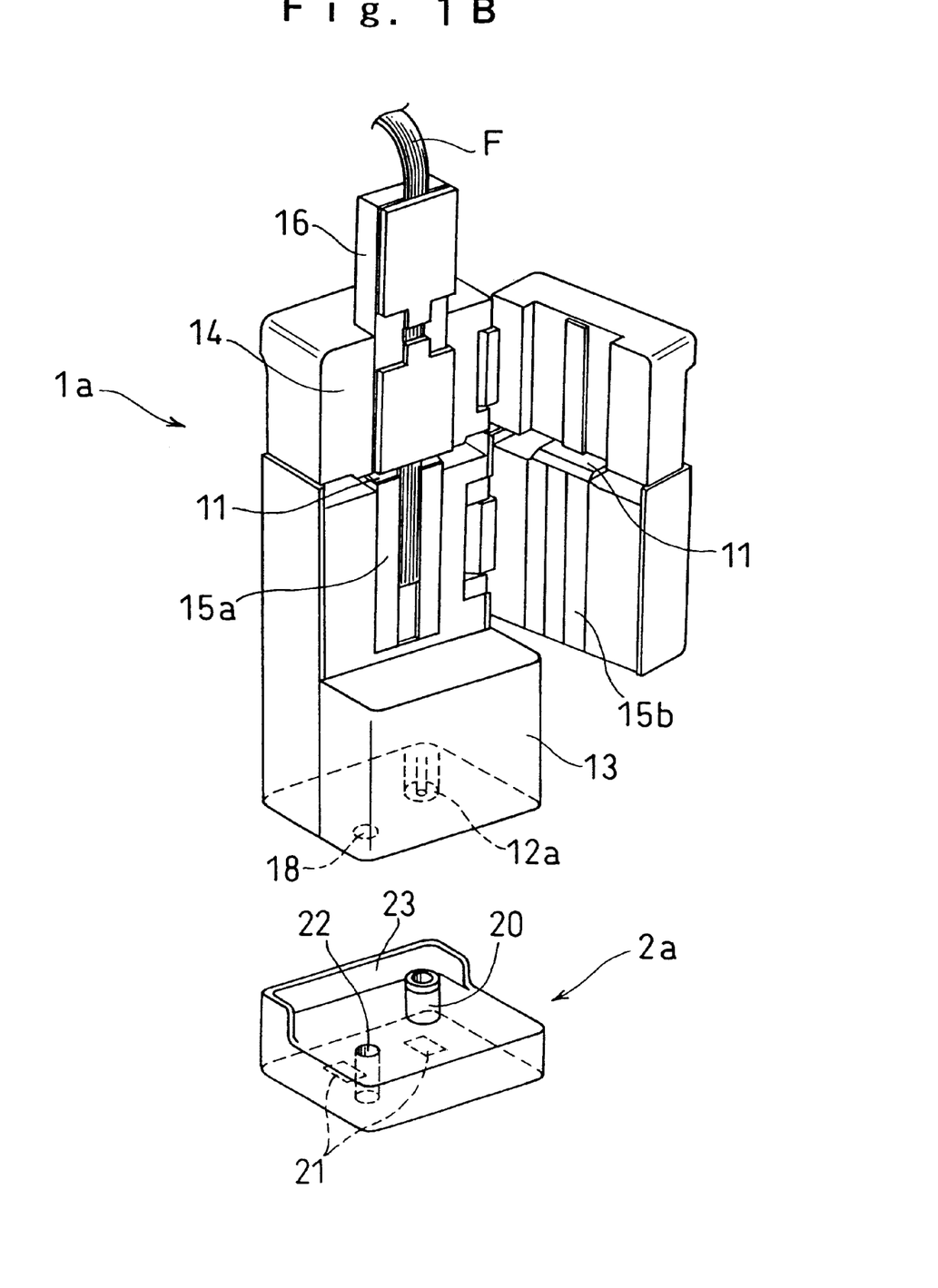
FIG. 1B is a perspective view showing a jacket stripper included in this apparatus according to the first embodiment of the present invention.

FIG. 1A is a schematic perspective view showing an optical fiber ribbon Fusion splicing apparatus according to an embodiment of the present invention. FIG. 1B is a detailed perspective view showing a jacket stripper 1a and an adapter 2a of this splicer.

A fusion splicer 4 has a dock 40 on its upper surface portion. The jacket stripper 1a is mounted on the dock 40 through the adapter 2a (these components will be described in detail later with reference to FIG. 1B). A pair of contact terminals 41 corresponding to a pair of contact terminals 21 formed on the bottom surface of the adapter 2a are formed on the bottom portion of the dock 40. The fusion splicing portion 43 may have the same structure as that of the fusion splicing apparatus disclosed in U.S. Pat. No. 5,533,160. Other well known structure may be used for the fusion splicing portion 43. Power is supplied to this apparatus by connecting a plug 42 to a plug socket.

FIG. 1B shows an optical fiber jacket stripper according to the first embodiment of the present invention, which can be mounted on the fusion splicer 4. The adapter 2a can be attached to the jacket stripper 1a.

The jacket stripper 1a includes a box member 13 and a slide portion 14 slidably mounted on the box member 13. The box member 13 and the slide portion 14 constitute the hand-held main body of the jacket stripper 1a. The form of the hand-held main body is designed for carrying with one hand.

The box member 13 has an almost rectangular parallelepiped shape. A portion of the box member 13 is formed to be openable such that holding plates 15a and 15b for holding an optical fiber ribbon F are placed on the inner surfaces of such opening and closing portion of the box member 13 which are brought into contact with each other. FIG. 1B shows a state in which the distal end portion of the optical fiber ribbon F is set on the holding plate 15a.

Figure 2A:
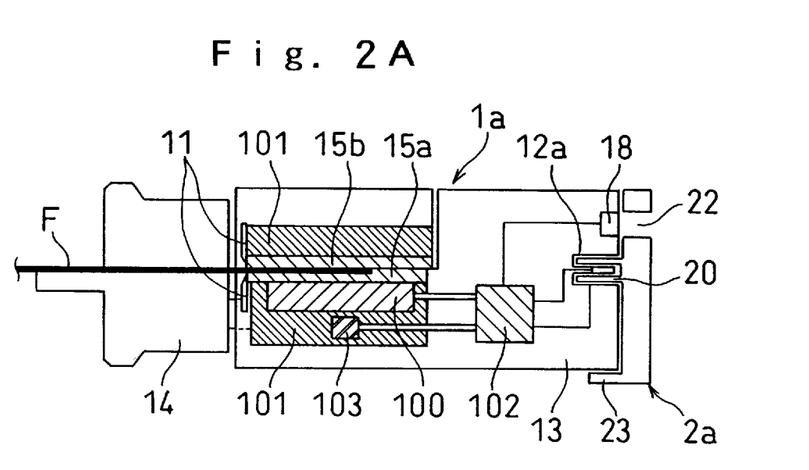
FIGS. 2A and 2B are sectional views showing a process of stripping off a fiber jacket of an optical cable by using the unit in FIG. 1B.

As shown in FIG. 2A, a heat source 100 constituted by a heater to be electrically heated or other heating means is placed in the box member 13 to be in contact with the rear surface of the holding plate 15a. A heat accumulator 101 is placed around the heat source 100 to be in contact therewith. The heat accumulator 101 is also placed on the rear surface of the holding plate 15b to be in contact therewith. The heat source 100 is connected to a temperature controlling circuit 102. A temperature sensor 103 is also connected to the temperature controlling circuit 102. The temperature sensor 103 is buried in the heat accumulator 101.

The temperature controlling circuit 102 controls the power supply to the heat source 100 on the basis of a signal from the temperature sensor 103 so as to maintain the temperature of the holding plates 15a and 15b within a predetermined temperature range. This temperature range can be adjusted with an adjustment knob 18 connected to the temperature controlling circuit 102. The opening and closing portion of the box member 13, the holding plates 15a and 15b, the heat source 100, the heat accumulator 101, and the temperature controlling circuit 102 constitute a clamping and heating element.

The heat accumulator 101 stores heat from the heat source 100 to keep the heat source 100 and the holding plates 15a and 15b warm. A member having a large heat capacity is used for the heat accumulator 101. For example, a liquid or solid material having a specific heat of 0.3 or more, and more specifically, a phenol resin, cork, cotton, an oil, or the like can be used. Of these materials, silicone oil and glass wool are preferably used because they are incombustible. When a liquid is to be used for the heat accumulator 101, a heat-resistant vessel is filled with the liquid and placed around the heat source 100.

The temperature controlling circuit 102 is connected to a plug-in type female terminal 12a formed on the outer surface of the box member 13. As the female terminal 12a, a general plug-in type jack is used.

A pair of cutting blades 11 are mounted on the box member 13 on its slide portion side. When the opening and closing portion of the box member 13 is closed, a slight gap is left between the pair of cutting blades 11. This gap is smaller than the thickness of the optical fiber ribbon F and is slightly larger than the diameter of the bare optical fibers in the optical fiber ribbon F. When the opening and closing portion of the box member 13 is closed, the cutting blades 11 cut only the fiber jacket of the optical fiber ribbon F but do not reach the bare optical fibers in the jacket.

The slide portion 14 slidably mounted on the box member 13 is designed to be openable like the opening and closing portion of the box member 13. A fiber holder 16 holding the optical fiber ribbon F can be set on this opening and closing portion of the slide portion 14. When the opening and closing portion is closed, the proximal end portion of the optical fiber ribbon F can be firmly held through the fiber holder 16. The slide portion 14 is coupled to the box member 13 through a pair of guide shafts 17 (see FIG. 2B). The slide portion 14 slides along the guide shafts 17 to separate from the box member 13. The slide portion 14, the fiber holder 16, the guide shafts 17, and the like constitute the above jacket stripping mechanism.

As shown in FIG. 1B, the adapter 2a to be attached to the jacket stripper 1a has a size corresponding to the surface of the jacket stripper 1a on which the female terminal 12a is formed. A male terminal 20 to be inserted into the female terminal 12a extends from the upper surface side of the adapter 2a. A bracket-like wall portion 23 is formed on an edge portion of the upper surface side of the adapter 2a. The wall portion 23 prevents the adapter 2a from rotating about the male terminal 20 when the adapter 2a is mounted on the jacket stripper 1a. Obviously, the wall portion 23 is not limited to the bracket-like shape to produce such an effect. For example, the wall portion 23 may be formed around the male terminal 20 or another type of recess/projection fitting portion may be formed.

The pair of contact terminals 21 electrically connected to the male terminal 20 inside the adapter 2a are arranged on the lower surface of the adapter 2a. These contact terminals 21 are exposed in a slightly recessed state with respect to the lower surface of the adapter 2a. When the jacket stripper 1a is mounted on the dock 40 of the fusion splicer 4 in FIG. 1A through the adapter 2a, these contact terminals 21 are respectively brought into contact with the corresponding contact terminals 41 of the dock 40. As a result, these contacts are electrically connected to each other, and a current supplied from an external power supply flows from the contact terminals 21 to the male terminal 20 and is supplied to the jacket stripper 1a side. The adapter 2a has a through hole 22 extending from the upper surface side to the lower surface side at a position corresponding to the position of the adjustment knob 18 when the adapter 2a is mounted on the jacket stripper 1a. Since the adapter 2a has the through hole 22, the adjustment knob 18 can be operated with a tool such as a screwdriver even while the adapter 2a is mounted on the jacket stripper 1a.

A method of using the above jacket stripper will be briefly described next.

First of all, the adapter 2a is attached to the jacket stripper 1a. The resultant structure is then mounted on the dock 40 of the fusion splicer 4 connected to the external power supply (see FIG. 1A). The plug 42 of the fusion splicer 4 is connected to the external power supply. A current is supplied from the external power supply to the jacket stripper 1a through the following path: contact terminals 41—contact terminals 21—male terminal 20—female terminal 12a. The current supplied to the jacket stripper 1a heats the heat source 100 through the temperature controlling circuit 102.

As the heat source 100 generates heat, the holding plates 15a and 15b and the heat accumulator 101 are heated. The temperature of the holding plates 15a and 15b is monitored through the temperature sensor 103 embedded in the heat accumulator 101. When this temperature exceeds the temperature range preset with the adjustment knob 18, the power to the heat source 100 is turned off by the temperature controlling circuit 102 to stop heat generation. When the power to the heat source 100 is broken, the temperature of the holding plates 15a and 15b starts to drop. When this temperature becomes lower than the preset temperature range, the power to the heat source 100 is supplied again to start generating heat.

The optimal temperature for softening the jacket of the optical fiber ribbon F differs depending on the type of optical fiber ribbon F. The adjustment knob 18 is therefore used to adjust the temperature of the holding plates 15a and 15b to the optimal temperature for softening the jacket.

While the jacket stripper is not used, the jacket stripper main body 1a to which the adapter 2a is attached is mounted on the dock 40, and the temperature of the holding plates 15a and 15b is maintained within the optimal temperature range for softening the jacket of the optical fiber ribbon F in this manner. When the jacket of the optical fiber ribbon F is to be removed, the optical fiber ribbon F is held by the fiber holder 16, the jacket stripper main body 1a to which the adapter 2a is attached is lifted from the dock 40, and the fiber holder 16 is set on the slide portion 14.

Subsequently, as shown in FIG. 2A, the opening and closing portions of the box member 13 and the slide portion 14 are closed. The distal end portion of the optical fiber ribbon F is clamped and held between the pair of holding plates 15a and 15b. The proximal end portion of the optical fiber ribbon F is held by the opening and closing portion of the slide portion 14 through the fiber holder 16. Note that when the optical fiber ribbon F is clamped between the holding plates 15a and 15b, only the fiber jacket is cut by the pair of cutting blades 11.

The jacket stripper 1a is disconnected from the external power supply when the jacket stripper 1a is lifted from the dock 40. As a result, the supply of a current to the heat source 100 is stopped. However, with the effect of the heat accumulator 101 around the heat source 100 and the holding plates 15a and 15b, the decrease in the temperatures of the heat source 100 and the holding plates 15a and 15b is gradual. For this reason, even after the jacket stripper 1a and the adapter 2a are lifted from the dock 40 and disconnected from the external power supply, the temperatures of the heat source 100 and the holding plates 15a and 15b can be maintained at temperatures high enough to remove the fiber jacket. The distal end portion of the optical fiber ribbon F is heated by the heat source 100 and the holding plates 15a and 15b so as to soften the fiber jacket.

Figure 2B:
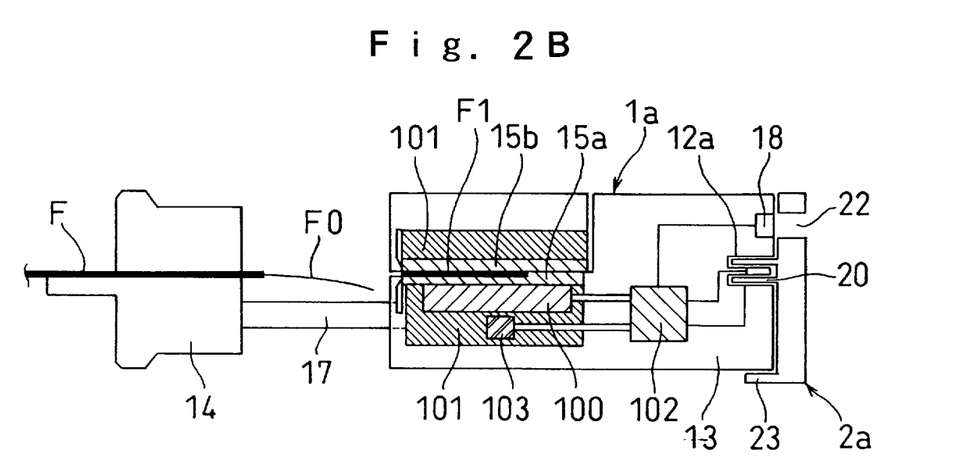

As shown in FIG. 2B, the slide portion 14 is slid while the opening and closing portion of the slide portion 14 is closed and firmly held. As the slide portion 14 slides, a jacket F1 on the distal end side cut by the cutting blades 11 is kept clamped between the holding plates 15a and 15b and hence is removed from the optical fiber ribbon F. After the jacket F1 on the distal end side is removed, a bare optical fibers F0 are exposed. At this time, since the jacket F1 on the distal end side has been heated and softened, the jacket F1 can be cleanly removed without leaving any residue and without applying any excessive force to the bare optical fibers F0.

After jacket stripping operation is complete, the optical fiber ribbon F is detached from the jacket stripper 1a, together with the fiber holder 16, and the next operation, e.g., cleaving and fusion splicing of end portions of the bare optical fibers, is performed. As the fiber holder 16 is designed to be directly set on the fusion splicer 4, the handling of the optical fiber ribbon F is facilitated. After jacket stripping operation is complete, the jacket F1 is removed from the holding plates 15a and 15b, and the jacket stripper 1a and the adapter 2a are mounted on the dock 40 of the fusion splicer 4 again while the opening and closing portion of the box member 13 is kept closed.

When the jacket stripper 1a and the adapter 2a are mounted on the dock 40, a current is supplied to the jacket stripper 1a again through the following path: contact terminals 41—contact terminals 21—male terminal 20—female terminal 12a. The heat source 100 is heated through the temperature controlling circuit 102 by the current supplied to the jacket stripper 1a, and the temperature of the holding plates 15a and 15b is maintained in the above temperature range. When jacket stripping operation is to be performed again, the jacket stripper 1a and the adapter 2a are lifted from the dock 40, and the jacket stripper 1a is used in the above manner.

The optical fibers F from which the jacket on the distal end portions have been stripped off by the jacket stripper 1a are usually cleaved and fusion spliced. In other words, the jacket on the distal end portions of the optical fibers F are removed to fusion-splice the distal end portions to each other. For this reason, jacket removal and fusion splicing are usually performed as a series of operations.

When jacket removal and fusion splicing are to be performed after the optical fiber ribbons F have been installed, these operations must be performed at the place where they are laid. In such a case, a sufficient space may not be ensured, or these operations may not be performed in a stable position. If, therefore, the jacket stripper 1a is attached to the fusion splicer 4, high workability can be obtained.

In the above, the fusion splicer having a relatively large size has been described. Obviously, however, the present invention can also be applied to a portable fusion splicer. The fusion splicer 4 in FIG. 1A has the plug 42 to be connected to the external power supply, and supplies a current from the external power supply to the jacket stripper 1a through the contact terminals 41. The jacket stripper may be driven by a built-in battery.

Figure 3:
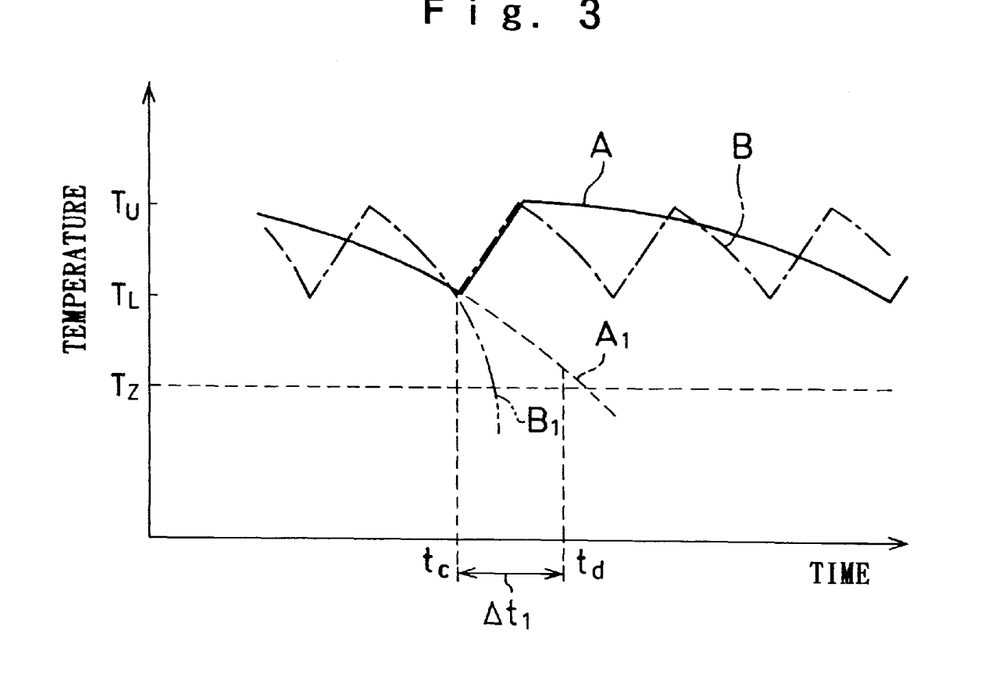
FIG. 3 is a graph showing the relationship between the temperature of holding plates of the remover in FIG. 1B and the time.

FIG. 3 is a graph showing the relationship between the temperature of the holding plates 15a and 15b and the time in the above jacket stripping operation. In the graph, "A" (solid line) represents the temperature-time curve obtained in the jacket stripper according to the present invention, and "B" (chain line) represents, for comparison, the temperature-time curve obtained in the jacket stripper without the heat accumulator 101. The temperature of the holding plates 15a and 15b is maintained in the range of $T_U$ to $T_L$, which is the optimal temperature range for softening and stripping the fiber jacket, while the holding plates 15a and 15b are connected to the external power supply. Reference symbol $T_Z$ denotes the minimum temperature required to successfully strip the fiber jacket.

Assume that the jacket stripper 1a to which the adapter 2a is attached is disconnected from the dock 40 at a lowest temperature $T_L$ in the temperature adjustment range of $T_U$ to $T_L$. This is the strictest condition in stripping the fiber jacket. Referring to the graph of FIG. 3, the temperature of the holding plates 15a and 15b becomes the lowest temperature in the temperature adjustment range of $T_U$ to $T_L$ at time $t_c$. If the jacket stripper 1a is disconnected from the external power supply at time $t_c$, the heat source 100 stops generating heat, and the temperature of the holding plates 15a and 15b further drops. In the graph shown in FIG. 3, "$A_1$" (dashed line) represents a drop in temperature in the jacket stripper according to the present invention, and $B_1$ (chain double-dashed line) represents a drop in temperature in the jacket stripper without the heat accumulator 101.

As is obvious from the curve $A_1$ in the graph, the temperature of the jacket stripper according to the present invention gradually drops because it has the heat accumulator 101. Even if, therefore, the jacket stripper 1a is disconnected from the external power supply under the strictest condition (when the temperature of the holding plates 15a and 15b is $T_L$), the temperature of the holding plates 15a and 15b does not drop below the minimum necessary temperature $T_Z$ even after a lapse of a time $\Delta t_1$ required for jacket removal. As is obvious from the curve $B_1$ (chain double-dashed line) in the graph, without the heat accumulator 101, the temperature of the holding plates 15a and 15b drops quickly. If, therefore, the jacket stripper 1a is disconnected from the external power supply under the strictest condition (when the temperature of the holding plates 15a and 15b is $T_L$), the temperature of the holding plates 15a and 15b drops below the minimum necessary temperature $T_Z$ before a lapse of the time $\Delta t_1$ required for jacket removal. In this case, the fiber jacket cannot be cleanly removed.

Assume that an optical fiber tape having a thickness of about 0.3 mm is used, and UV acrylic is used for the jacket. In this case, $T_U$ is 90° C., $T_L$ is 70° C., $T_Z$ is 60° C., and the time required for jacket removal is about 20 to 30 sec. Therefore, the clamping and heating element preferably has a heat accumulator that can maintain the temperature of the holding plates 15a and 15b within the range of 70° C. to 60° C. for 20 sec or more, more preferably, 30 sec or more, when the power is cut off.

Note that each portion of the curve A (solid line) or B (chain double-dashed line) which extends to upper right corresponds to the time during which the heat source 100 is heated. Obviously, power is consumed while the heat source 100 is heated. As is obvious from the graph, according to the jacket stripper according to the present invention, the heat source 100 is less frequency heated when the apparatus has the heat accumulator 101 than when the apparatus does not have the heat accumulator 101. As a result, the present invention can save electric power.

In the above jacket stripper, the heat source 100 is placed in contact with only one of the holding plates 15a and 15b. However, the heat source 100 is preferably placed in contact with each of the holding plates 15a and 15b. This apparatus can handle an optical fiber as well as the optical fiber ribbon.

Figure 4:
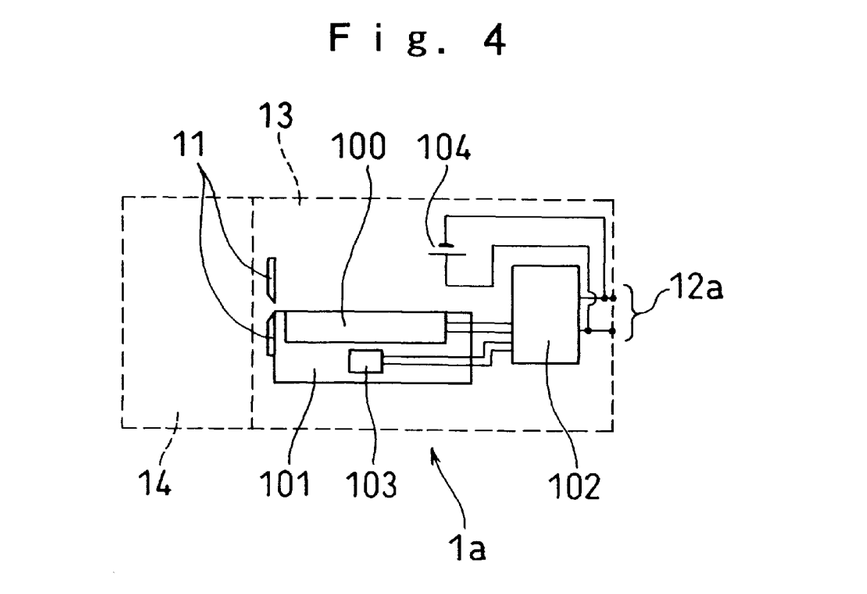
FIG. 4 is a schematic view showing a state in which a rechargeable battery is built into the main body in FIG. 1B.

Note that the jacket stripper shown in FIG. 1B can be modified such that a rechargeable battery 104 is built into the box member 13, as shown in FIG. 4. With this structure, when the jacket stripper is disconnected from the external power supply, the heat source 100 can be kept heated as long as a current is supplied from the rechargeable battery 104 to the heat accumulator 101, allowing the temperature controlling circuit 102 to continue temperature adjustment. This further prolongs the operable time after disconnection from the external power supply.

Figure 5A:
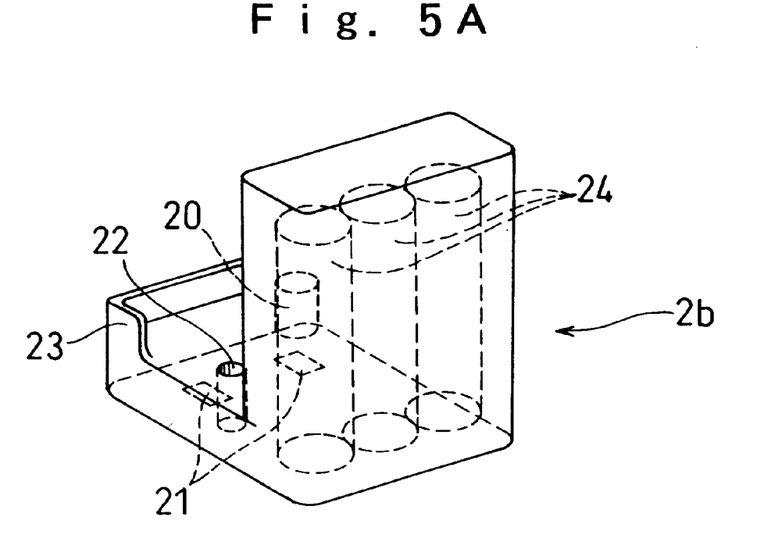
FIG. 5A is a perspective view showing an adapter incorporating a rechargeable battery according to the present invention.
Figure 5B:
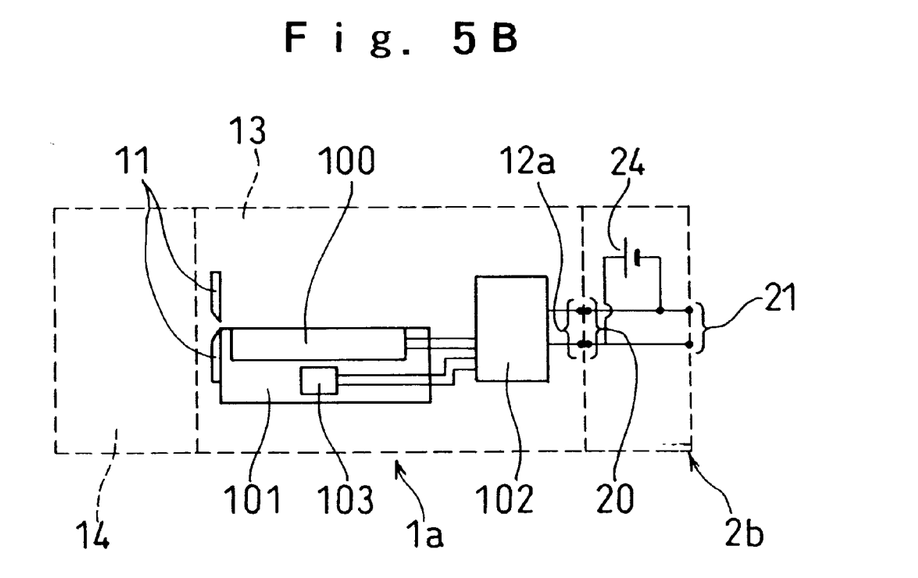
FIG. 5B is a view showing the arrangement of the jacket stripper to which the adapter is attached.

FIGS. 5A and 5B show another modification of the jacket stripper with the built-in battery. According to the method shown in FIGS. 5A and 5B, a rechargeable battery 24 is placed in the adapter 2b, and the adapter 2b is attached to the jacket stripper 1a. This structure further prolongs the operation time after disconnection from the external power supply. In addition, since the rechargeable battery need not be built into the jacket stripper 1a, a conventional jacket stripper can be used as the jacket stripper 1a described above without remodeling it, if its performance is acceptable.

These rechargeable batteries 104 and 24 are charged while the jacket stripper 1a to which the adapter 2a or 2b is attached is mounted on the dock 40 of the fusion splicer 4. However, this charging operation may be performed while heat is generated by the heat source 100 or only for a period during which such heat generation is stopped, selecting an optimal charging method. It suffices if an optimal charging method is selected in consideration of the type of battery and the like.

Figure 6:
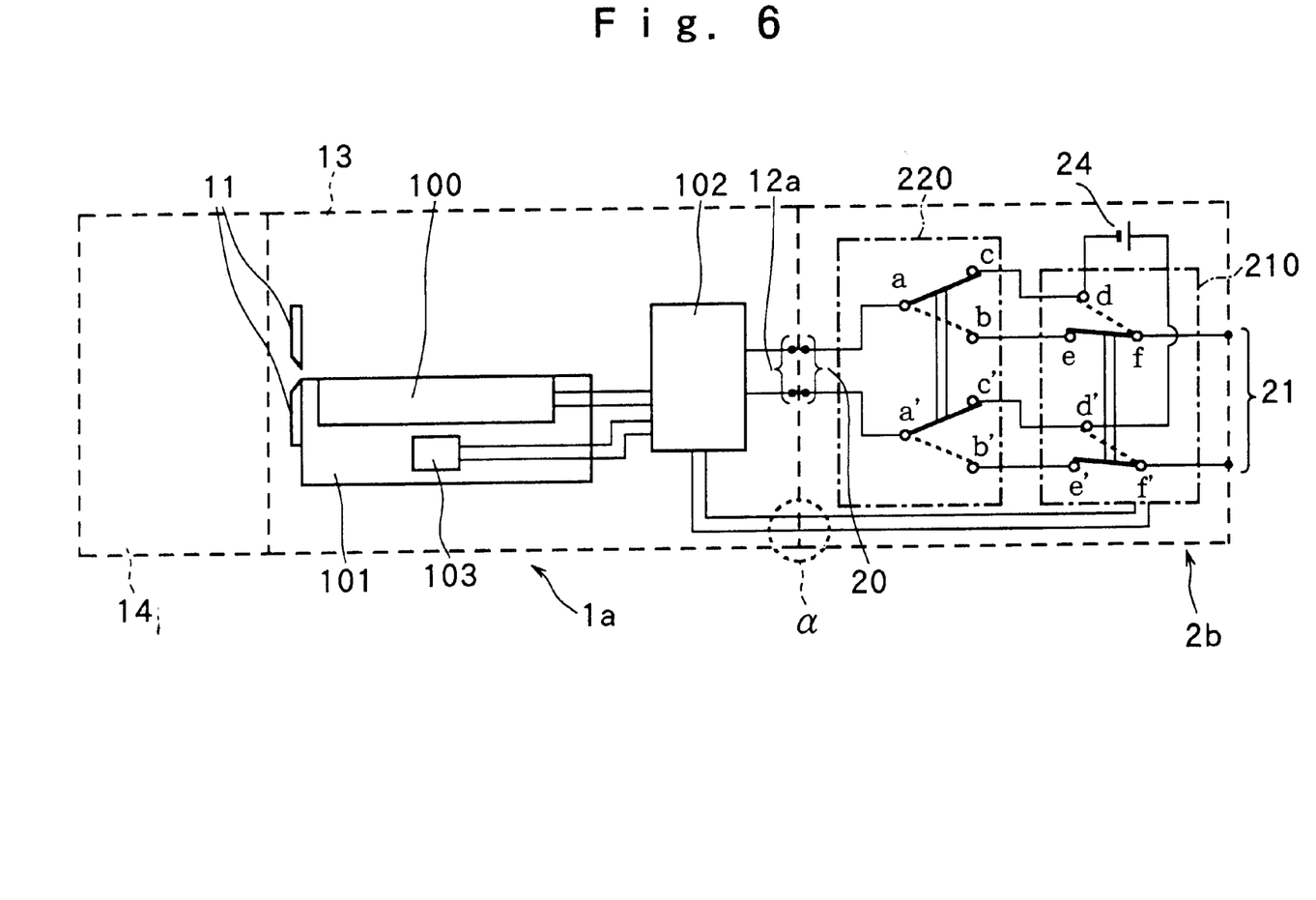
FIG. 6 is a schematic view showing the jacket stripper having a switch portion incorporated in the adapter according to the present invention.

As shown in FIG. 6, the adapter 2b may incorporate a switch portion 210 for switching such that the current from the external power supply is supplied to either the rechargeable battery 24 or the male terminal 20. Referring to FIG. 6, the adapter 2b includes a switching portion 220 as well as the switch portion 210.

The switch portion 210 incorporates a switching mechanism capable of switching such that the current from the external power supply is supplied to either the rechargeable battery 24 or the male terminal 20 on the basis of an instruction from the temperature controlling circuit 102. When a current from the external power supply is to be supplied to the rechargeable battery 24, points f and d and points f' and d' in FIG. 6 are connected to each other. When a current from the external power supply is to be supplied to the male terminal 20, the current from the external power supply is finally supplied to the clamping and heating element (especially the heat source 100 thereof) of the jacket stripper 1a through the male terminal 20.

The switch portion 210 is connected to the temperature controlling circuit 102. The above switching operation is performed on the basis of a signal from the temperature controlling circuit 102. To electrically connect the temperature controlling circuit 102 to the switch portion 210, terminals similar to the female terminal 12a and the male terminal 20 must be formed on the bottom portion of the jacket stripper 1a and the upper surface of the adapter 2b (a portion a in FIG. 6).

The switching portion 220 serves as a mechanism for mechanically switching current sources for the clamping and heating element. Switching is performed by the switching portion 220 as follows. While the adapter 2b attached to the jacket stripper 1a is mounted on the dock 40, points b and "a" and points b' and a' in FIG. 6 are connected to each other. When the adapter 2b is lifted from the dock 40, points c and "a" and points c' and a' are connected to each other.

Figure 7A:
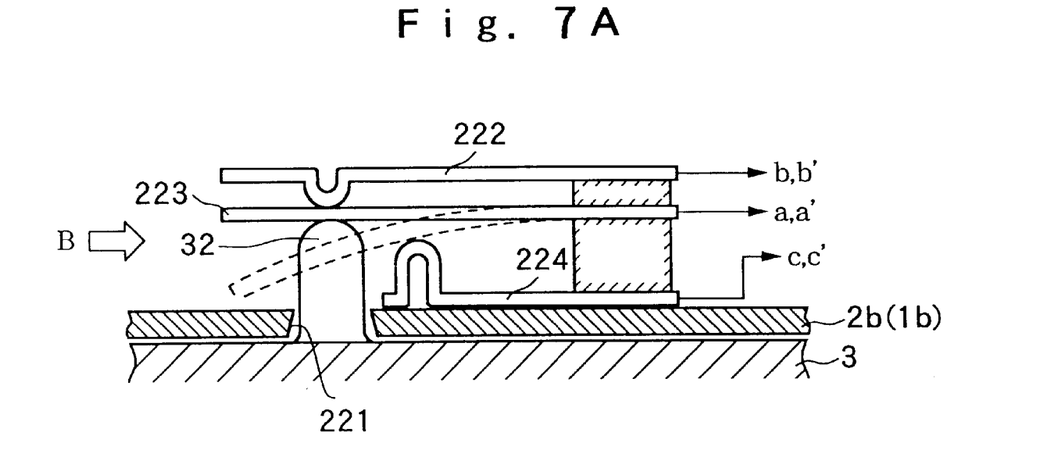
FIG. 7A is a sectional view taken in a direction 7A in FIG. 7B.
Figure 7B:
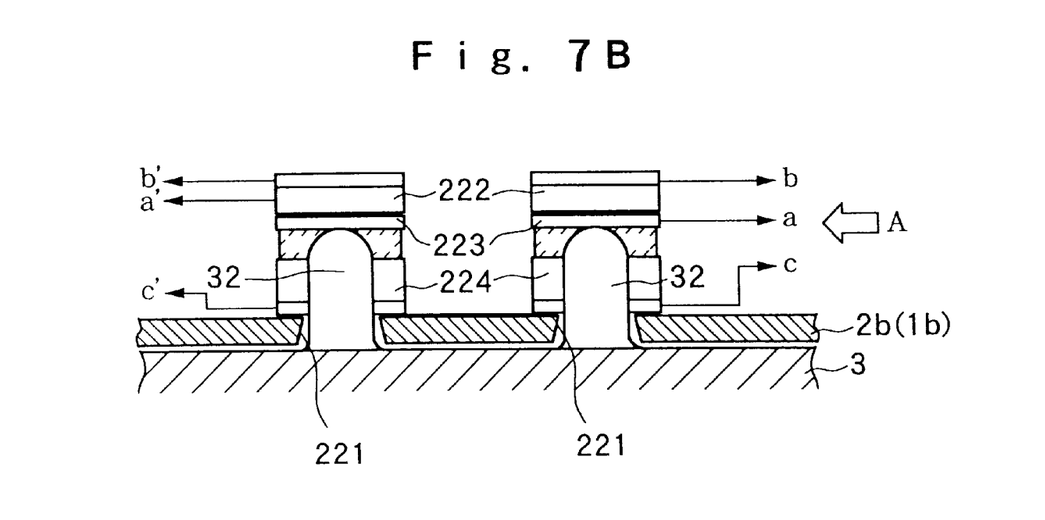
FIG. 7B is a sectional view taken in a direction 7B in FIG. 7A.

FIGS. 7A and 7B show a detailed structure of the switching portion 220. A pair of holes 221 are formed in the bottom portion of the adapter 2b, and three terminal plates 222, 223, and 224 are arranged inside each hole 221. The upper two terminal plates 222 and 223 extend immediately above the hole 221, and the lowermost terminal plate 224 is located on the sides of the hole 221. The terminal plates 222, 223, and 224 are respectively connected to the points b (b'), "a" (a'), and c (c').

The intermediate terminal plate 223 is elastically deformable. In the absence of external force, the terminal plate 223 bends downward to come into contact with the lower terminal plate 224, as indicated by the dashed line in FIG. 7A. In this case, a pair of contact terminals 32 projected upright from the bottom surface of a mount portion 30 of a holder 3. When the adapter 2b is mounted on the mount portion, the terminals 32 are inserted into the holes 221 to bend the intermediate terminal plates 223.

When the adapter 2b is mounted on the holder 3, the terminals 32 are inserted into the holes 221, the intermediate terminal plates 223 are deformed by the distal ends of the terminals 32, as shown in FIGS. 7A and 7B. As a result, the intermediate terminal plates 223 are connected to the upper terminal plates 222 (i.e., the points b and "a" and the points b' and a' in FIG. 6 are connected to each other). When the adapter 2b is lifted from the dock 40, together with the jacket stripper 1a, the terminals 32 are removed from the holes 221, and the intermediate terminal plates 223 bend downward due to elastic restoring force. As a result, the intermediate terminal plates 223 are connected to the lower terminal plates 224 (i.e., the points c and "a" and the points c' and a' in FIG. 6 are connected to each other).

A method of supplying a current from the external power supply when the adapter 2b includes the switch portion 210 and the switching portion 220 will be described below.

Consider, first of all, a case in which the jacket stripper 1a and the adapter 2b are mounted on the dock 40. In this case, the switching portion 220 is switched to "b–a, b'–a'" side, as described above. If the temperature of the holding plates 15a and 15b which is detected by the temperature sensor 103 falls within the predetermined range (between $T_U$ and $T_L$ in FIG. 3), the temperature controlling circuit 102 determines that the current need not be supplied to the clamping and heating element but to the rechargeable battery 24 to charge it. The temperature controlling circuit 102 then switches the switch portion 210 to "f–d, f'–d'" side.

While the switch portion 210 is switched to "f–d, f'–d'" side, a current is supplied from a capacitor or built-in battery to the temperature controlling circuit 102 for a predetermined period of time. This predetermined period of time is set to be sufficiently longer than the time between the instant at which the temperature of the holding plates 15a and 15b drops from the upper limit ($T_U$ in FIG. 3) of the predetermined range to the lower limit ($T_L$ in FIG. 3) of the predetermined range after the temperature controlling circuit 102 is disconnected from the external power supply and the instant at which the temperature controlling circuit 102 restores the connection with the external power supply.

If the temperature of the holding plates 15a and 15b which is detected by the temperature sensor 103 is below the lower limit ($T_L$ in FIG. 3) of the predetermined range, the temperature controlling circuit 102 determines that a current from the external power supply must be supplied to the clamping and heating element, and switches the switch portion 210 to "f–e, f'–e'" side. The heat source 100 of the clamping and heating element is heated by the supplied current to raise the temperature of the holding plates 15a and 15b. If the temperature of the holding plates 15a and 15b which is detected by the temperature sensor 103 exceeds the upper limit ($T_U$ in FIG. 3) of the predetermined range, the temperature controlling circuit 102 determines that no current from the external power supply need be supplied to the clamping and heating element, but a current must be supplied to the rechargeable battery 24 to charge it until the battery voltage becomes higher than a predetermined value. The temperature controlling circuit 102 then switches the switch portion 210 to "f–d, f'–d'" side.

Assume that the jacket stripper 1a and the adapter 2b are mounted on the dock 40, the rechargeable battery 24 is sufficiently charged, and the temperature of the holding plates 15a and 15b which is detected by the temperature sensor 103 falls within the predetermined range. In this case, although a current from the external power supply is supplied to the temperature controlling circuit 102, the current path in the temperature controlling circuit 102 is broken to prevent any current from being supplied from the temperature controlling circuit 102 to the heat source portion 100. When the temperature of the holding plates 15a and 15b which is detected by the temperature sensor 103 becomes lower than the lower limit ($T_L$ in FIG. 3) of the predetermined range afterward, the temperature controlling circuit 102 determines that a current from the external power supply must be supplied to the clamping and heating element, and supplies the current from the temperature controlling circuit 102 to the heat source 100.

When the jacket stripper 1b is connected to the external power supply, the above arrangement serves to automatically switch between the state in which a current is supplied to the heat accumulator of the jacket stripper and the state in which a current is supplied to the rechargeable battery built into the adapter 2b. Since the battery is charged intermittently in a series of splicing operation while optical fibers cleaved and spliced, the jacket stripper can be semipermanently used without requiring little extra time for charging the battery.

Consider a case in which the jacket stripper 1a and the adapter 2b are lifted from the dock 40. In this case, the switching portion 220 is switched to "c–a, c'–a'" side. When the switching portion 220 is switched to "c–a, c'–a'" side, a current is automatically supplied from the rechargeable battery 24 to the temperature controlling circuit 102. If the temperature of the holding plates 15a and 15b which is detected by the temperature sensor 103 falls within the predetermined range, the current path in the temperature controlling circuit 102 is interrupted to prevent any current from being supplied from the rechargeable battery 24 to the heat source portion 100. When the temperature of the holding plates 15a and 15b which is detected by the temperature sensor 103 becomes lower than the lower limit ($T_L$ in FIG. 3) of the predetermined range, the temperature controlling circuit 102 determines that a current must be supplied from the rechargeable battery 24 to the clamping and heating element, and supplies a current from the battery 24 to the heat source 100. With all these temperature stabilizing functions, an alarm function may be added to indicate that the jacket stripper 1a be put on the dock 40 to restore the connection when the temperature decrease below the lower limit $T_L$.

A jacket stripper according to the second embodiment of the present invention will be described next with reference to the accompanying drawings.

Figure 8:
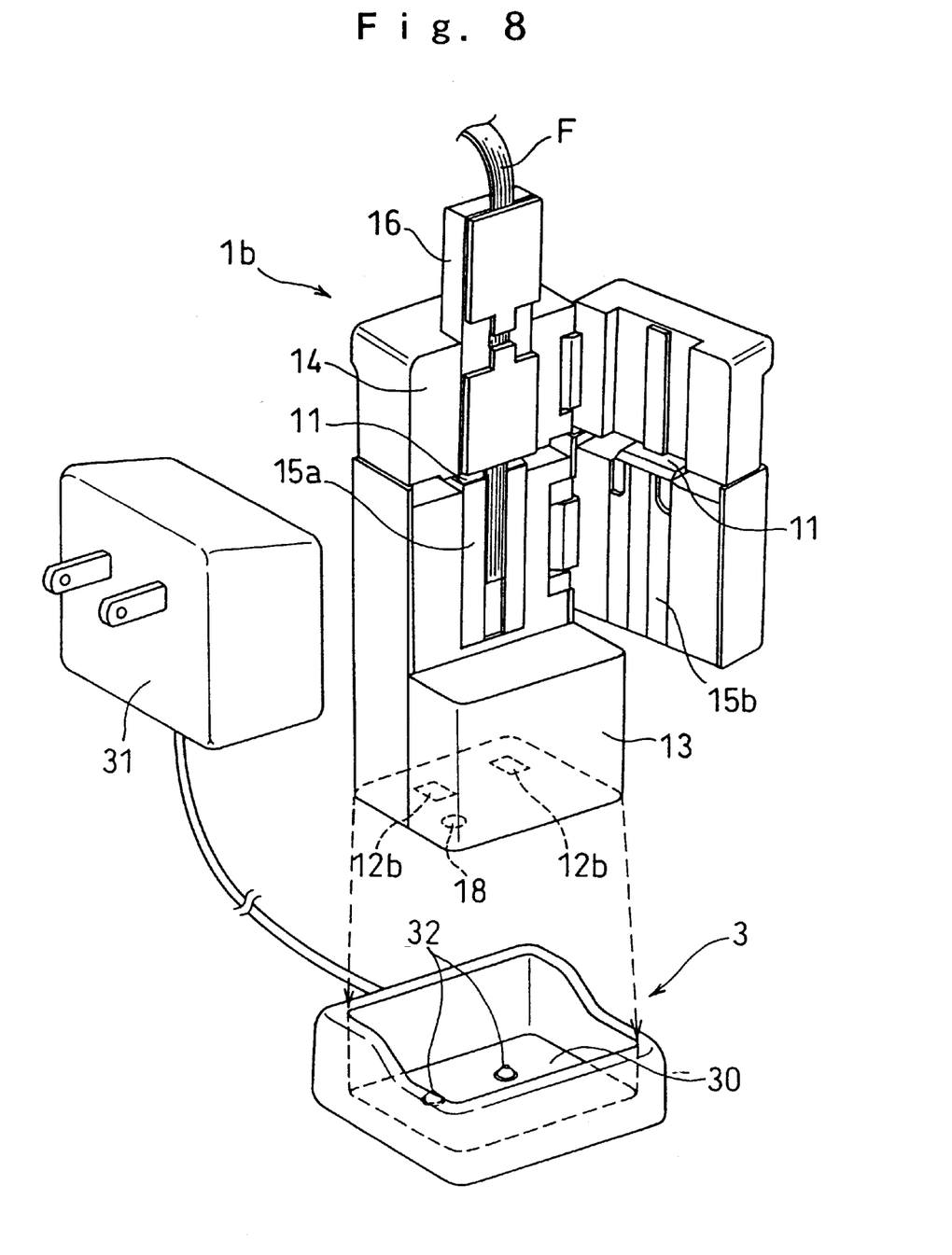
FIG. 8 is a perspective view showing an optic al cable jacket stripper according to the second embodiment of the present invention.

FIG. 8 shows an optical fiber jacket stripper according to the second embodiment of the present invention. This jacket stripper has an arrangement similar to that of the jacket stripper 1a shown in FIG. 1B except that the adapter 2a is integrated into the jacket stripper 1b. The same reference numerals in FIG. 8 therefore denote the same parts as those of the jacket stripper shown in FIG. 1B, and a detailed description thereof will be omitted.

A holder 3 is attached to a jacket stripper 1b. The holder 3 has a concave mount portion 30 having a substantially rectangular bottom surface corresponding to the shape of the bottom portion of the jacket stripper 1b. The holder 3 also has an AC-DC plug portion 31 to be connected to an external power supply or the external power supply output terminal of a fusion splicer. The jacket stripper 1b is mounted in the mount portion 30 of the holder 3. A pair of contact terminals 12b are formed on the outer surface of the jacket stripper main body 1b which opposes the bottom surface of the mount portion 30. A pair of contact terminals 32 corresponding to the pair of contact terminals 12b extend from the bottom portion of the mount portion 30. The contact terminals 32 are pushed upward by springs to be reliably brought into contact with the contact terminals 12b when the jacket stripper 1b is mounted in the mount portion 30. A current from the external power supply is supplied to the temperature controlling circuit 102 in the jacket stripper 1b through the pair of contact terminals 32 of the holder 3 and the pair of contact terminals 12b of the jacket stripper 1b. Since a method of using this jacket stripper is the same as that for the jacket stripper shown in FIG. 1B, a description thereof will be omitted.

With this arrangement, the jacket removal can be reliably performed, and an improvement in workability can be attained by disconnecting the jacket stripper from the holder 3 when the remover is to be used. In addition, the following effect can be obtained. With this arrangement, the jacket stripper 1b can be reduced in size and hence can be easily handled when the operator removes the fiber jacket while holding the jacket stripper 1b with his/her hand. A rechargeable battery 104 can be built into the jacket stripper shown in FIG. 8 like the unit shown in FIG. 4. The rechargeable battery 104 built into the jacket stripper can further prolong the operation time after disconnection from the holder 3.

Figure 9:
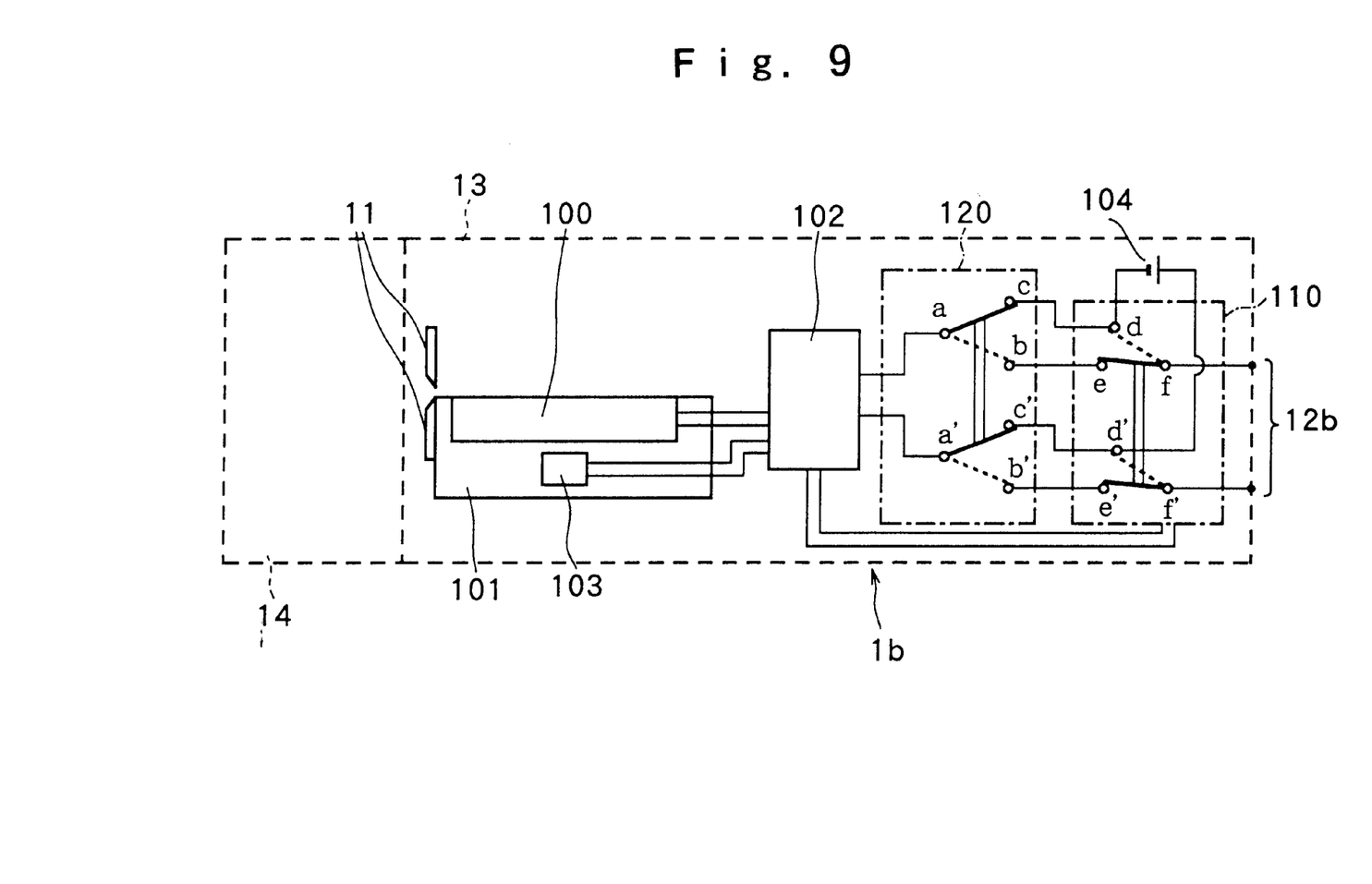
FIG. 9 is a schematic view showing the jacket stripper incorporating a switch portion in the main body.

As shown in FIG. 9, when the rechargeable battery 104 is built into the jacket stripper 1b, the unit may incorporate a switch portion 110 for switching such that the current from the external power supply is supplied to either the rechargeable battery 104 or the clamping and heating element (especially a heat source 100). Referring to FIG. 9, the jacket stripper includes a switching portion 120 as well as the switch portion 110. When a current from the external power supply is to be supplied to the clamping and heating element by the switch portion 110, the current is supplied through a temperature controlling circuit 102 and the switching portion 120.

The switch portion 110 incorporates a switching mechanism capable of switching the supply of current from the external power supply between the rechargeable battery 104 and the clamping and heating element on the basis of an instruction from the temperature controlling circuit 102. That is, when a current from the external power supply is to be supplied to the rechargeable battery 104, points f and d and points f' and d' in FIG. 9 are connected to each other. When a current from the external power supply is to be supplied to the clamping and heating element, points f and e and points f' and e' in FIG. 9 are connected to each other. The switch portion 110 is connected to the temperature controlling circuit 102. The above switching operation is performed on the basis of a signal from the temperature controlling circuit 102.

The switching portion 120 serves as a mechanism for mechanically switching current sources for the clamping and heating element. When the jacket stripper 1b is mounted on the holder 3, the switching portion 120 is switched such that points b and "a" and points b' and a' in FIG. 9 are connected to each other. When the jacket stripper 1b is lifted from the holder 3, points c and "a" and points c' and a' in FIG. 9 are connected to each other. Since the detailed structure of the switching portion 120 is the same as that shown in FIGS. 7A and 7B, a detailed description thereof will be omitted.

A method of supplying a current from the external power supply when the jacket stripper 1b has the switch portion 110 and the switching portion 120 will be described.

Consider, first of all, a case in which the jacket stripper 1b is mounted on the holder 3. As described above, the switching portion 120 has been switched to "b–a, b'–a'" side. If the temperature of plate-like portions 15a and 15b which is detected by a temperature sensor 103 falls within a predetermined range (between $T_U$ and $T_L$ in FIG. 3), the temperature controlling circuit 102 determines that no current from the external power supply need be supplied to the clamping and heating element, but a current must be supplied to a rechargeable battery 24 to charge it, and the switch portion 110 is switched to "f–d, f'–d'" side.

Note that even while the switch portion 110 is switched to "f–d, f'–d'" side, a current is supplied from a capacitor or built-in battery to the temperature controlling circuit 102 for a predetermined period of time. This predetermined period of time is set to be sufficiently longer than the time between the instant at which the temperature of the holding plates 15a and 15b drops from the upper limit ($T_U$ in FIG. 3) of the predetermined range to the lower limit ($T_L$ in FIG. 3) of the predetermined range after the temperature controlling circuit 102 is disconnected from the external power supply and the instant at which the temperature controlling circuit 102 restores the connection with the external power supply.

If the temperature of the holding plates 15a and 15b which is detected by the temperature sensor 103 is below the lower limit ($T_L$ in FIG. 3) of the predetermined range, the temperature controlling circuit 102 determines that a current from the external power supply must be supplied to the clamping and heating element, and the switch portion 110 is switched to "f–e, f'–e'" side. The heat source 100 of the clamping and heating element is heated by the supplied current to raise the temperature of the holding plates 15a and 15b. If the temperature of the holding plates 15a and 15b which is detected by the temperature sensor 103 exceeds the upper limit ($T_U$ in FIG. 3) of the predetermined range with this rise in temperature, the temperature controlling circuit 102 determines that any current from the external power supply need not be supplied to the clamping and heating element, but a current must be supplied to the rechargeable battery 104 to charge it. The temperature controlling circuit 102 then switches the switch portion 210 to "f–d, f'–d'" side.

Assume that the jacket stripper 1b is mounted on the holder 3, the rechargeable battery 104 is sufficiently charged, and the temperature of the holding plates 15a and 15b which is detected by the temperature sensor 103 falls within the predetermined range. In this case, although a current from the external power supply is supplied to the temperature controlling circuit 102, the current path in the temperature controlling circuit 102 is interrupted to prevent any current from being supplied from the temperature controlling circuit 102 to the heat source 100. When the temperature of the holding plates 15a and 15b which is detected by the temperature sensor 103 becomes lower than the lower limit ($T_L$ in FIG. 3) of the predetermined range afterward, the temperature controlling circuit 102 determines that a current from the external power supply must be supplied to the clamping and heating element, and supplies the current from the temperature controlling circuit 102 to the heat source 100.

When the jacket stripper 1b is connected to the holder 3, the above arrangement serves to automatically switch between the state in which a current is supplied to the heat retaining mechanism of the jacket stripper and the state in which a current is supplied to the rechargeable battery built in the jacket stripper main body 1b. Since the battery is additionally charged while optical fibers are spliced, the jacket stripper can be semipermanently used without requiring extra time for charging the battery.

Consider a case in which the jacket stripper 1b is lifted from the holder 3. In this case, the switching portion 120 is switched to "c–a, c'–a'" side, as described above. When the switching portion 120 is switched to "c–a, c'–a'" side, a current is automatically supplied from the rechargeable battery 104 to the temperature controlling circuit 102. If the temperature of the holding plates 15a and 15b which is detected by the temperature sensor 103 falls within the predetermined range, the current path in the temperature controlling circuit 102 is interrupted to prevent any current from being supplied from the rechargeable battery 104 to the heat source 100. When the temperature of the holding plates 15a and 15b which is detected by the temperature sensor 103 becomes lower than the lower limit ($T_L$ in FIG. 3) of the predetermined range, the temperature controlling circuit 102 determines that a current must be supplied from the rechargeable battery 104 to the clamping and heating element, and supplies a current from the temperature controlling circuit 102 to the heat source 100.

From the invention thus described, it will be obvious that the embodiments of the invention may be varied in many ways. For example, a mechanical switch may be replaced by an electronic switch. Such variations are not to be regarded as a departure from the spirit and scope of the invention, and all such modifications as would be obvious to one skilled in the art are intended for inclusion within the scope of the following claims.

What is claimed is:

1. An optical fiber fusion splicing apparatus for fusion-splicing end faces of optical fibers to each other, comprising:
    an optical fiber jacket stripper including
        a hand-held main body,
        a power supply input terminal formed on one surface of said main body,
        a clamping and heating element for clamping a distal end portion of an optical fiber jacket and softening the distal end portion by heating with a heat accumulator which is electrically heated and has a large heat capacity,
        a pair of cutting blades for cutting a fiber jacket,
        a jacket stripping mechanism which is placed to oppose said clamping and heating element through said cutting blades and slides in a longitudinal direction of the optical fibers with respect to said clamping and heating element while clamping the proximal end portion of the optical fiber, thereby stripping off the fiber jacket from the distal end portion,
        a rechargeable battery built in said main body for supplying power to said clamping and heating element when said power supply input terminal is unconnected to outer power supply, and
        a switch for switching a current supplied from said power supply input terminal to either said rechargeable battery or said clamping and heating element; and
    an optical fusion splicer including
        a fusion splicing portion for fusion-splicing the opposing end faces of the optical fibers whose jackets are stripped off by said fiber jacket stripper,
        a power supply unit connected to an external power supply or an internal power supply which is a built-in electric power generating unit or a rechargeable battery,
        a mount portion formed on upper surface of said optical fusion splicer for mounting said jacket stripper, and
        a contact terminal disposed at said mount portion and electrically connected to said power supply input terminal when said jacket stripper is mounted on said mount portion.

2. An apparatus according to claim 1, wherein said heat accumulator can keep a temperature of said clamping and heating element over 60° C. for 30 sec after the power supply to said clamping and heating element is stopped when the temperature of said clamping and heating element rises over 70° C.

3. An apparatus according to claim 1, wherein said jacket stripper further comprises a temperature sensor for detecting a temperature of said heat accumulator, and a temperature controlling circuit for performing switching control on said switch on the basis of a temperature detected by said temperature sensor.

4. An optical fiber fusion splicing apparatus for fusion-splicing end faces of optical fibers to each other, comprising:
    an optical fiber jacket stripper including
        a hand-held main body,
        a power supply input terminal formed on one surface of said main body,
        a clamping and heating element for clamping a distal end portion of an optical fiber jacket and softening the distal end portion by heating with heat accumulator which is electrically heated and has a large heat capacity, a pair of cutting blades for cutting a fiber jacket, a jacket stripping mechanism which is placed to oppose said clamping and heating element through said cutting blades and slides in a longitudinal direction of the optical fibers with respect to said clamping and heating element while clamping the proximal end portion of the optical fiber, thereby stripping off the fiber jacket from the distal end portion, an optical fusion splicer including a fusion splicing portion for fusion-splicing the opposing end faces of the optical fibers whose jackets are stripped off by said fiber jacket stripper, a power supply unit connected to an external power supply or an internal power supply which is a built-in electric power generating unit or a rechargeable battery, a mount portion formed on upper surface of said optical fusion splicer for mounting said jacket stripper, and a contact terminal disposed at said mount portion and electrically connected to said power supply input terminal when said jacket stripper is mounted on said mount portion, and an adapter for electrically connecting said power supply input terminal to said contact terminal.

5. An apparatus according to claim 4, further comprising a rechargeable battery in said adapter, said rechargeable battery being capable of supply power to said clamping and heating element.

6. An apparatus according to claim 5, wherein said jacket stripper further comprises a switch for switching such that a current from said power supply terminal is supplied to either said rechargeable battery or said clamping and heating element.

7. An apparatus according to claim 6, wherein said jacket stripper further comprises a temperature sensor for detecting a temperature of said heat accumulator, and a temperature controlling circuit for performing switching control on said switch on the basis of a temperature detected by said temperature sensor.

8. An apparatus according to claim 4, wherein said adapter can be connected to an external power supply as well as said contact terminal.

\* \* \* \* \*